March 3, 1964   J. NOTARO ETAL   3,123,096
OXYGEN COMPRESSOR FEATHER VALVE
Filed Dec. 15, 1961

INVENTORS
JOHN NOTARO
CHRISTIAN F. GOTTZMAN
CARLOS M. HEATH

BY Richard S. Shrevs, Jr
ATTORNEY

United States Patent Office 3,123,096
Patented Mar. 3, 1964

3,123,096
OXYGEN COMPRESSOR FEATHER VALVE
John Notaro, West Seneca, Christian F. Gottzmann, Clarence, and Carlos M. Heath, Kenmore, N.Y., assignors to Union Carbide Corporation, a corporation of New York
Filed Dec. 15, 1961, Ser. No. 159,615
9 Claims. (Cl. 137—525)

This invention relates to oxygen compressor feather valves, and more particularly, to a non-lubricated valve of this character.

Feather valves have performed reasonably well in services permitting lubrication of the valves. However, in dry gas service, where liquid lubricants are undesirable, and the removal of lubricants has resulted in high rates of valve wear, high maintenance costs and frequent shutdowns for valve replacement. Feather valves have performed reasonably well in services permitting lubrication of the valves. However, in dry gas service, where liquid lubricants are undesirable, the removal of lubricants has resulted in high rates of valve wear, high maintenance costs and frequent shutdowns for valve replacement. Operating problems have been particularly severe in oxygen service because of the occurrence of fretting corrosion in the absence of lubricants.

It is therefore the main object of the present invention to provide a feather valve for non-lubricated oxygen service which achieves a long life of maintenance-free and wear-free service.

According to the present invention, mating grooves are formed in the valve guard and seat, spaced beyond the ends of the valve orifice and forming bearing cavities, and rollers at the ends of the feather are journaled in these cavities. Preferably, the rollers are slotted to receive the ends of the feather, the rollers are constructed of self-lubricated filled plastic, and one of the mating faces of the feather and seat is coated with a wear-resistant coating.

Figure 1:
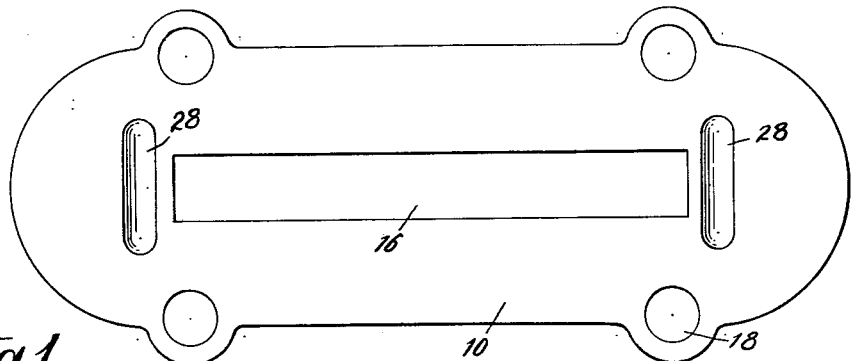
FIG. 1 is a bottom plan of the valve seat.
Figure 2:
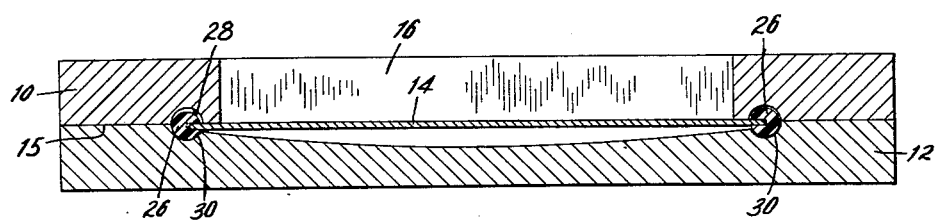
FIG. 2 is a central cross section through the assembled valve.
Figure 3:
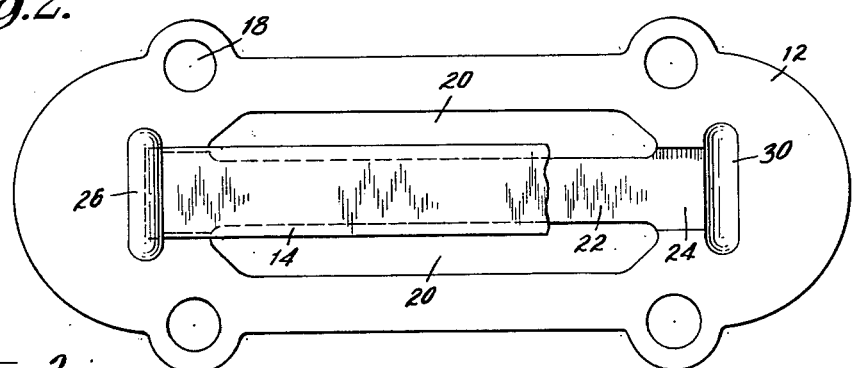
FIG. 3 is a plan of the valve guard and feather with the seat removed.

The valve consists of a valve seat 10, a valve guard 12, and a valve feather 14. The seat 10 is usually of cast iron, ground and polished on the top face 15. A rectangular hole or port 16 is machined through the valve seat.

The valve guard 12, also of cast iron, is shaped to mate with the seat 10, with bolt holes 18 for clamping the two members securely together. Slots 20 are provided through the cover on both sides of the longitudinal centerline leaving a guard bar 22 which extends over the port 16 when the valve is assembled. The inside of the guard bar is machined concave with a long radius so that the depression thus formed extends beyond the ends of the bar to form rectangular recesses 24 under which the ends of the valve port are centered in assembly.

The feather 14 consists of a flat polished strip of hard spring metal, shaped rectangularly to fit over the port 16, with, for example, $3/32$ inch overlap at the long edges. The ends of the feather fit into the recesses 24 with close clearance when the valve is assembled.

The seal is effected by exerting pressure on the feather from the cover side, which presses the edges of the feather against the polished surface of the seat. The valve is opened by reversing the pressure differential, i.e. by exerting pressure from the port side. This bends or deflects the center of the feather into the guard depression, and completes flow passages around the edges from the port to the cover slots.

Thus, it is seen that the feather valve is a form of spring-loaded check valve. Its distinctive feature is that the spring and the closure are integral, and the closure is depressed elastically to open the valve. Energy needed to re-close the valve is stored in the depressed feather.

Conventionally, the valve assemblies are bolted to the side of the compressor cylinder over the suction and discharge channels. The port side is outward for the suction valve and inward for the discharge valve.

According to the present invention, low-friction rollers 26 are provided at the two ends of the feather 14. Preferably, the rollers are slotted to receive the tips of the feather. These rollers support the ends of the feather and are held in over-sized cavities formed by registering grooves 28 and 30 milled in the seat and guard.

Preferably, rollers for non-lubricated valves are constructed of self-lubricating material such as a filled polytetrafluoroethylene (Teflon). A filler of particulate glass (25 weight-percent) is preferred; but other filler materials such as molybdenum disulfide, carbon or fine rouge are suitable. In addition to plastic-base materials, porous metals impregnated with a solid lubricating material such as polytetrafluoroethylene may also be used.

Lubricated valves will also benefit by the use of rollers, although to lesser extent. Lubricated rollers may be constructed of almost any substance such as bronze which performs well as a bearing in contact with the valve surfaces.

The rollers provide low friction support surfaces for the ends of the feather, which surfaces are free to rotate with the ends of the feather as it deflects. As the feather deforms in an arc, the roller slot always aligns itself with the feather end-surfaces. The feather slides straight, in-and-out of the slot and does not exert a prying action. Furthermore, the sliding friction is distributed over the bearing surface of the slot and is not concentrated under the corner of the feather end.

The roller cavity is positioned with respect to the seat surfaces so that the guard-groove contacts the roller lightly and holds the feather against the seat. This positions the roller off-center in the over-sized cavity so that it makes only tangential contact with the cavity surface. This feature prevents feather impact and chatter and also ensures freedom of the roller to turn without restraint.

In modifying a valve for roller installation, the most critical dimension is the depth of the groove in the guard measured between the seat surface and the bottom of the guard cavity, preferably equal to ½ the sum of the roller diameter and the feather thickness. In practice, cold clearance of .001 in. to .005 in. should be provided to allow for thermal expansion of the Teflon as the valve warms up to service temperature.

Figure 5:
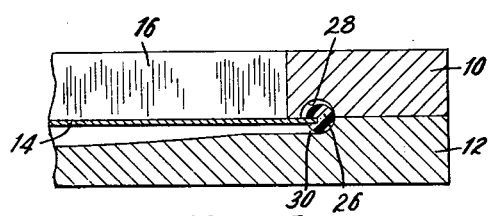
FIG. 5 is a similar view of a further modification.
Figure 4:
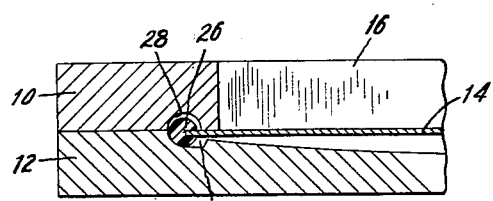
FIG. 4 is similar to a portion of FIG. 2, showing a modification.

The modification shown in FIG. 4 serves to further reduce friction on the moving parts. The inner wall of the guard groove is relieved slightly at 28 to enlarge the groove. This permits the roller to roll inward as it turns so that it follows the end of the feather. The sliding motion of the feather end in the slot is thus reduced or eliminated. If desired, the inner wall of the guard groove may be removed completely as at 30 in FIG. 5. However, this also removes a portion of the supporting surface for the feather when in the open position and may be prohibitive in some services.

Thus, it is seen that a means is provided for greatly reducing friction in the critical end regions of the valve.

While roller supports delay the onset of severe seat wear, their maximum benefit is obtained in combination with a wear-resistant coating for the sealing surface. Examples of such coatings are polytetrafluoroethylene, aluminum oxide, and tungsten carbide.

Plastic coatings such as polytetrafluoroethylene (Teflon) may be applied to either the feather or the seat, or to both surfaces. Tests have not shown an advantage in coating both surfaces. With only one surface coated, the coating material is soon transferred to the opposite surface so that both are adequately protected against wear. It is preferred to coat the feather because it is a smaller part and requires less plastic material. Also, when both sides of the feather are coated, it can be turned over to still further prolong the service life of the part.

The hard coatings such as aluminum oxide and tungsten carbide should be applied to the seat. If applied to the feather, they may crack or chip as the feather is flexed. Good results have been obtained with a plasma arc spray coating of aluminum oxide containing a small amount (4–5%) of titanium. Good performance has also been obtained with a high velocity flame spray coating of tungsten carbide. Another desirable coating is an electroless nickel deposit obtained, for example, by the decomposition of a suitable nickel compound. Other possible hard coatings are chrome plating, flame plated coats other than tungsten carbide and Stellite. Silver plating, while not especially hard, is resistant to fretting.

Alternative to the application of hard coatings, special seat inserts of suitable wear-resistant metal may be used. For example, a relatively thin, type 410 stainless steel insert shaped to form the edges of port 16 may be recessed into the surface of the seat casting. As a further alternative, the entire valve seat may be milled from the special hard material rather than from cast iron. However, a thin spray applied or plated coating is the preferred hard-surface embodiment.

Tests have shown that these special surfaces used alone will not greatly reduce the rate of wear or extend the valve service life. The same high rate of wear is observed at the critical ends of the feather and in the feather guides. However, when used in combination with low-friction rollers for the feather ends, the special surfaces effectively reduce seat wear and extend valve life several-fold in unlubricated compressors. Significant improvement is also obtained in lubricated compressors.

The present invention completes the provision of a non-lubricated cylinder for air oxygen compressor. The need for lubrication on the cylinder walls is eliminated by self-lubricating rings preferably formed of polytetrafluoroethylene filled with particulate glass or carbon. Lubrication of rod packing is eliminated by self-lubricating segmental packing rings according to the copending application of Murto et al., Serial No. 46,021, filed July 28, 1960. The present roller mounted feather valves combined therewith provides for the first time, a completely non-lubricated cylinder.

What is claimed is:

1. Feather valve comprising a valve seat having an elongated central orifice therein, a valve guard mating with said seat, a feather between said guard and seat, mating grooves in said guard and seat spaced beyond the ends of said orifice forming bearing cavities, and rollers at the ends of said feather journaled in said cavities, said cavities being oversized to position the rollers off center to make only tangential contact with the cavity surfaces.

2. Feather valve as claimed in claim 1, in which said rollers are slotted to receive the ends of said feather.

3. Feather valve as claimed in claim 1, in which said rollers are constructed of self-lubricating filled plastic.

4. Feather valve as claimed in claim 1, in which the guard groove is only slightly deeper than the radius of the roller, by the order of half the thickness of the feather.

5. Feather valve as claimed in claim 1, in which one of the mating surfaces of the feather and seat is coated with a wear-resistant coating.

6. Feather valve as claimed in claim 5, in which the wear-resistant coating is polytetrafluoroethylene.

7. Feather valve as claimed in claim 5, in which the wear-resistant coating is a hard metallic material applied to the seat.

8. Feather valve as claimed in claim 1, in which the roller is initially offset away from the port in a lateral direction.

9. Feather valve as claimed in claim 1 in which the inward side of the guard groove is relieved.

References Cited in the file of this patent

UNITED STATES PATENTS

| | | |
|---|---|---|
| 1,947,935 | Gibson | Oct. 20, 1934 |
| 2,587,569 | Giaque | Feb. 26, 1952 |
| 2,622,949 | Cotchett | Dec. 23, 1952 |
| 2,666,677 | Miller | Jan. 19, 1954 |
| 2,807,511 | Fleming | Sept. 24, 1957 |
| 2,885,178 | Mott | May 5, 1959 |